Jan. 18, 1966     C. H. KOHFIELD     3,229,408
TROLLING SINKER-PLOW
Filed May 20, 1963
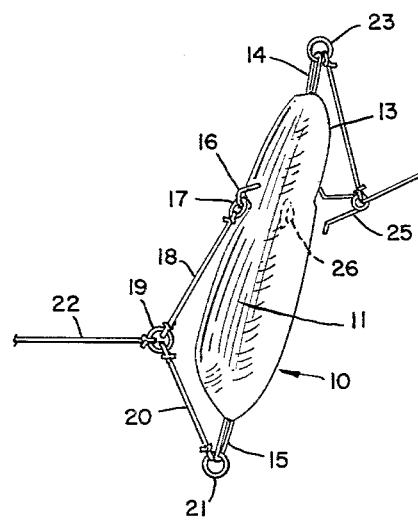
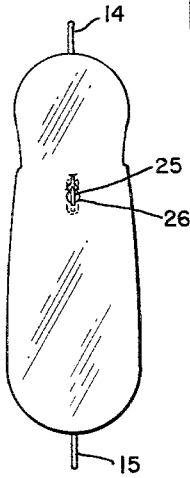
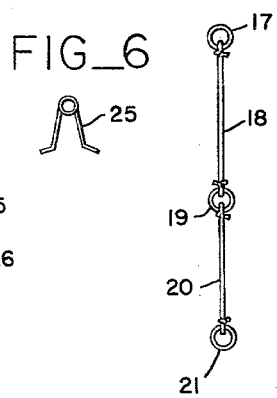
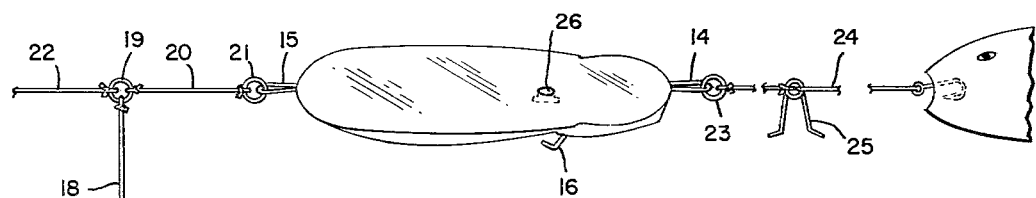
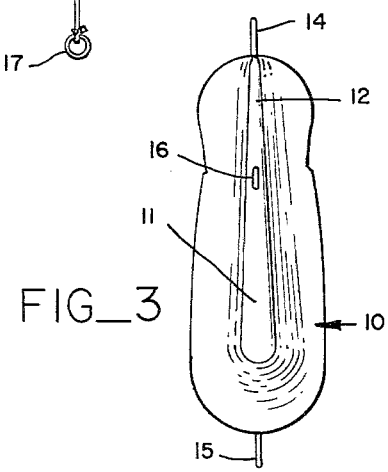
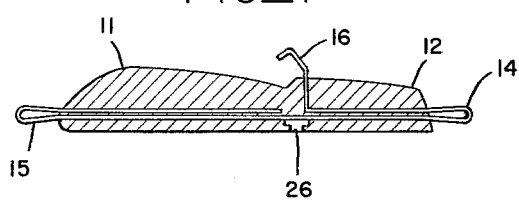
INVENTOR.
CARL H. KOHFIELD
BY
Mellin, Moore & Weisenberger
ATTORNEYS United States Patent Office 3,229,408
Patented Jan. 18, 1966

1

3,229,408
TROLLING SINKER-PLOW
Carl H. Kohfield, 68 Lloyd St., San Francisco 17, Calif.
Filed May 20, 1963, Ser. No. 281,843
1 Claim. (Cl. 43—43.1)

This invention relates to trolling sinkers and, more to a sinker that penetrates the water to a desired depth, and that can be retrieved with minimal effort when its trailing lure has been struck.

It is an object of the present invention to provide a trolling sinker which can be made of any heavy material such as lead, iron, brass, etc.

Other objects of the invention are to provide a trolling sinker of a simple construction, that has a minimum number of parts, is inexpensive to manufacture, and efficient in use, in any desired size.

For other objects and for a better understanding of the invention, reference may be had to the following detailed description taken in accordance with the accompanying drawings, in which;

FIG. 1 is a perspective view of the sinker fully assembled in operative position.

FIG. 2 shows the sinker after the fish has been caught.

FIG. 3 is a top view of the sinker in its operative position.

FIG. 4 is the bottom view of the sinker.

FIG. 5 shows the line connection means adapted for attachment to the forward part of the sinker.

FIG. 6 shows the coilpin used in the leader release.

With general reference to the drawings, the invention includes a solid mass which may be molded of lead, iron, or brass, etc. The mass is defined by outer edge 10 and includes keel 11 and stablizing fin 12. The tail portion is lighter in weight than the body portion.

As best seen in FIG. 7, a wire runs through and is molded into the body portion to define loop 14, loop 15, and hook 16, each of which is exterior of the mass.

With reference to FIG. 5, ring 17 is fastened to line 18 which in turn is fastened to ring 19. Line 20 is also fastened to ring 19 and line 20 is in turn fastened to ring 21. Ring 21 passes through loop 15 as best seen in FIG. 2.

As shown in FIG. 1, line 22 is the common line attached to ring 19 and the fishing rod.

Leader 24 is attached to ring 23. Ring 23 passes through loop 14. Leader 24 passes through the eye of coil pin 25 and attaches to lure 27.

Coil pin 25 is ordinarily seated in ball hole 26 and has sufficient biasing power to remain seated in ball hole 26 (as against the drag of lure 27) until lure 27 is struck.

2

In any event, the implement is so designed as to penetrate the water at most any desired depth, depending upon the length of line put into play. Also, the sinker can be retrived with a minimal amount of effort after a fish is hooked, or the lure has been struck. The coil pin 25 will depart from the ¾ ball hole 26 when the fish strikes and this will cause the sinker to tilt, and in turn release ring 17 from hook 16. The sinker will then turn in a facedown position as illustrated in FIG. 2. The density of the water will then cause the sinker to rise to the surface while trolling.

It will be noted that the entire body of the sinker can be molded in one simple operation at a cost no greater than that of conventional sinkers.

While the preferred forms of embodiments have been illustrated, various modifications of the invention may be made without departing from the spirit or scope thereof, and it is to be understood that the invention is to be limited only as defined in the appended claim.

I claim:

A trolling sinker comprising an elongated solid body element having a nose, a wide face and a tail portion, the face portion being provided with a keel extending the length thereof, the tail portion being higher than the rest of the sinker and having a stabilizing fin thereon, the back surface of the sinker being provided with a ball shaped recess located at a distance of about ⅔ the length of the sinker, from nose to tail, the tail being provided with a first ring to which the leader for a lure is attached, the said leader also carrying a spring-coil pin adapted to be engaged within the ball-shaped recess of the sinker in operative position, the nose of the sinker being provided with a second ring to which the fishing line is affixed, the face portion of the sinker being provided with an open hook element adapted in operative position to engage a third ring secured to the fishing line and to release the said third ring when a fish has been caught after the sinker has been tilted as a result of disengagement of the spring coilpin from the recess.

References Cited by the Examiner

UNITED STATES PATENTS

| | | | |
|---|---|---|---|
| 2,017,903 | 10/1935 | Johnson | 43—42.47 |
| 2,596,201 | 5/1952 | Bocchino | 43—42.39 |
| 2,963,812 | 12/1960 | Kellogg | 43—42.39 |

SAMUEL KOREN, *Primary Examiner.*

MELVIN D. REIN, ABRAHAM G. STONE,
*Examiners.*